United States Patent [15] 3,653,007

Murakami et al. [45] Mar. 28, 1972

[54] FLAT TYPE MAGNETIC THIN FILM MEMORY

[72] Inventors: Yoshio Murakami, Yokohama; Iwao Higashinakagawa, Kawasaki; Nobuaki Yasuda, Zushi; Motoharu Sato, Kawasaki, all of Japan

[73] Assignee: Tokyo Shibaura Electric Co., Ltd., Kawasaki-shi, Japan

[22] Filed: Feb. 19, 1970

[21] Appl. No.: 12,781

[30] Foreign Application Priority Data

Feb. 19, 1969 Japan....................................44/11764
May 14, 1969 Japan....................................44/36686

[52] U.S. Cl. ..............340/174 TF, 340/174 M, 340/174 BC, 340/174 NA, 340/174 JA, 29/604

[51] Int. Cl...........................................................G11c 11/14

[58] Field of Search ...................29/604; 156/331; 260/78 R; 340/174 TF

[56] References Cited

UNITED STATES PATENTS

| | | | |
|---|---|---|---|
| 3,343,145 | 9/1967 | Bertelsen | 340/174 TF |
| 3,471,453 | 10/1969 | Rabilloud et al. | 260/78 R |
| 3,500,356 | 3/1970 | Feissel | 340/174 TF |
| 3,350,180 | 10/1967 | Croll | 340/174 TF |

*Primary Examiner*—James W. Moffitt
*Attorney*—Flynn & Frishauf

[57] ABSTRACT

A flat type magnetic thin film memory comprising a metal substrate, at least one group of drive lines each provided with a magnetic thin film to define a magnetic circuit and extending over and parallel with the substrate and an insulation layer of a polyimide resin intervening (i.e., interposed) between the substrate and the drive line group.

9 Claims, 4 Drawing Figures

FLAT TYPE MAGNETIC THIN FILM MEMORY

BACKGROUND OF THE INVENTION

This invention relates to a planar or flat, multilayer type magnetic thin film memory.

The magnetic thin film memories are broadly divided into the flat type and wire type memories. The bit density of the wire memory is usually about one bit per square millimeter. For quick operation and cost reduction of the memory, it is necessary to increase the bit density. In this respect, the flat type multilayer memory is excellent, which is fabricated by successively stacking the memory elements on a flat metal substrate by the techniques involving vacuum deposition, electroplating, photo-etching and so forth.

In the flat type magnetic thin film memory, in which a drive line group is formed by successively depositing and photo-etching at a predetermined pitch a magnetic thin film, a metal layer of high conductivity and another magnetic thin film on an insulation layer atop a metal substrate, the nature of the insulation layer is important.

The insulation layer is required to have a microscopically smooth ground surface, lest the magnetic thin film to be formed thereon would suffer from the shape magnetic anisotropy. Also, where another drive line group is formed on another insulation layer, which is formed on the first drive line group previously formed through a photo-etching process, the material of the insulation layer is desired to be of such nature as to level the unevenness of the surface of the previously formed drive line group. Further, when the magnetic thin film is formed by depositing permalloy, the insulation layer should withstand a temperature of over 300° C. as it is necessary to heat the substrate at about 300° C.

Usually, a deposited layer of silicon monoxide is used as the insulation layer. In this case, the unevenness of the metal substrate surface is transferred to the surface of the insulation layer, so that the substrate surface should be smooth to a high degree. Moreover, the insulation layer is required to have a thickness of from several microns to several tens of microns. It takes time to deposit a silicon monoxide layer of such thickness, which is thus unsuitable for mass production.

SUMMARY OF THE INVENTION

It is an object of the invention to provide a flat type magnetic thin film memory, wherein the insulation material is a polyimide resin, which enables obtaining a smooth insulation layer surface, on which to form the magnetic thin film, even if the surface, on which to form the insulation layer, is not smooth.

According to this invention, there is provided a flat type magnetic thin film memory comprising a metal substrate, at least one group of drive lines provided with a permalloy thin film and arranged over the substrate and an insulation layer of a polyimide resin intervening (i.e., interposed) between the substrate and the drive line group.

The polyimide resin having a sufficient heat-resisting property is suitable as the foundation for the magnetic thin film, since by applying it in the liquid form on the substrate surface and curing it by heat treatment the unevenness of the substrate surface is embedded to give a smooth upper surface of the insulation layer.

It is also suitable as the foundation for other drive line group, as it can level the unevenness of the drive line group formed through the photo-etching process.

DESCRIPTION OF THE PREFERRED EMBODIMENTS

The invention is now described in connection with the construction of preferred embodiments of the flat type magnetic thin film memory according to the invention with reference to the accompanying drawing.

Figure 1A:
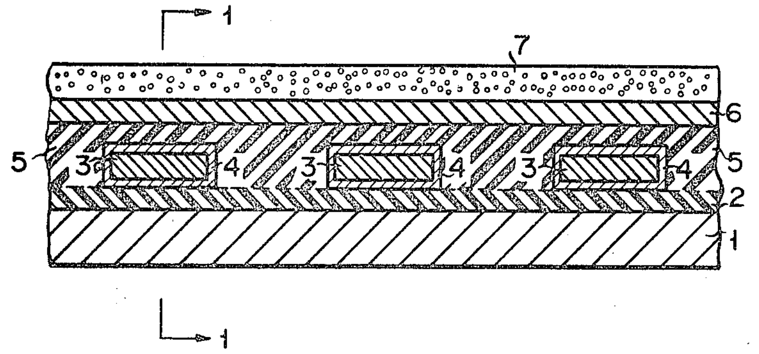
FIG. 1A is a fragmentary sectional view of one embodiment of the flat type magnetic thin film memory according to the invention taken in the direction of the digit lines.
Figure 1B:
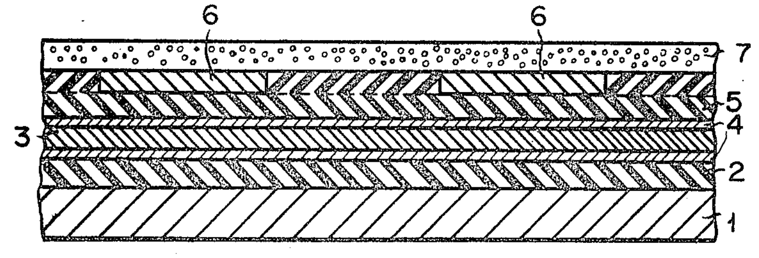
FIG. 1B is a fragmentary sectional view taken along line 1—1 in FIG. 1A.

Referring now to FIGS. 1A and 1B, there is shown over a metal substrate 1 and atop a first insulation layer 2 a group of digit lines 3 as the first drive line group extending parallel with the substrate 1. Each digit line 3 is surrounded by a magnetic thin film 4 of permalloy to define a closed magnetic circuit. The easy direction of the magnetic thin film 4 is perpendicular to the digit line 3. Over the digit line group 3 and the first insulation layer 2 is arranged through a second insulation layer 5 a group of word lines 6 as the second drive lines extending at right angles to the digit lines 3 and contiguous to an upper magnetic keeper 7 of ferrite. Permalloy may be used also as the magnetic keeper. It requires, however, a further insulation layer between the magnetic keeper 7 and the word line group 6, as permalloy is a conductive material.

It is to be understood that the digit line group 3 and the word line group 6 are electrically connected to the metal substrate 1 at the end thereof in the same manner as the well-known memory device.

Figure 2A:
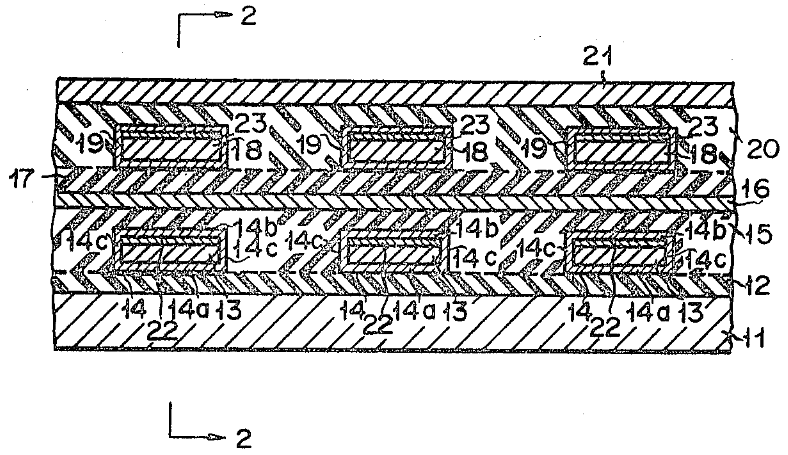
FIG. 2A is a fragmentary sectional view of another embodiment of the flat type magnetic thin film memory according to the invention taken in the direction of the digit lines.
Figure 2B:
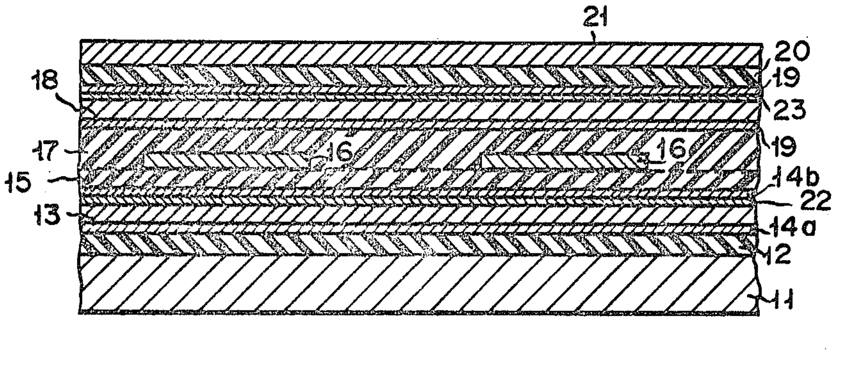
FIG. 2B is a fragmentary sectional view taken along line 2—2 in FIG. 2A.

A disadvantage of the memory construction shown in FIGS. 1A and 1B arising from a difference in the magnitude of the magnetic flux density between the upper and lower sides of the digit lines is improved by a construction shown in FIGS. 2A and 2B.

In this construction, there is also arranged over a metal substrate 11 through a first insulation layer 12 a first digit line group 13, with each digit line surrounded by a thin permalloy film 14 defining a closed magnetic circuit and the easy direction of the magnetic thin film directed at right angles to the digit line 13. Over the first digit line group 13 is arranged through a second insulation layer 15 a word line group 16, over which is further arranged through an insulation layer 17 a second digit line group 18 with each digit line surrounded by a magnetic thin film 19 to form a closed magnetic circuit similar to the first digit line group 13 and extending precisely over the corresponding one of the first group of digit lines. Over the second digit lines is formed through an insulation layer 20 a metal layer 21. Although not shown in the drawing, the digit line groups 13 and 18 are connected to each other, while the word line group 16 is connected to the metal substrate 11, at an end thereof. In this memory construction, one digit line of the first digit line group and the corresponding one of the digit lines of the second group constitute one digit to be memorized.

As is described, in the memories according to the invention, a polyimide resin is used at least for the insulation layer, that is formed prior to the final formation of the magnetic thin film on the drive lines.

Though the polyimide resin is suitable to the flat type magnetic thin film memories of the foregoing constructions, it presents a problem during the manufacture of the memory unit.

In the manufacture of the memory units of the constructions shown in FIGS. 1A and 1B and in FIGS. 2A and 2B, polyimide resin is applied on, for instance, a copper substrate, and is then thermally cured at a temperature of 200° to 300° C. Then, on the polyimide resin is deposited at a temperature of 300° C. a first permalloy film, on which is deposited at room temperature a copper layer serving as the current paths, on which is in turn deposited at a temperature of 300° C. a second permalloy film. Thereafter, the first and second permalloy films and the copper layer are photo-etched into parallel strips at a predetermined pitch to form the digit line group.

During this process, particularly in the step of heating the substrate in vacuum to deposit the second magnetic film on the copper layer, bubbles are generated at the boundary between the copper substrate and the insulation layer contiguous thereto. As a result, the magnetic films are locally separated from the substrate to affect the magnetic characteristics.

The bubbles are considered to be generated from the following grounds:

Copper constituting the substrate is an easily oxidizable material, so that it is formed with a cuprous oxide film at its surfaces and contains oxygen in the form of cuprous oxide in its body.

In the deposition of permalloy at the temperature of 300° C., hydrogen takes a considerable proportion of the residual gas in the vacuum chamber.

As the hydrogen atoms are small in diameter, they penetrate into the copper deposited layer and the polyimide resin insulation layer to reach the copper substrate, thereby reducing the cuprous oxide on the substrate surface to produce water vapor, which is of too large a molecular diameter to penetrate the copper deposited layer, thus resulting in the formation of the bubbles.

In practice the copper substrate is washed prior to the manufacturing process to remove the oxide film on the surface thereof, but a new oxide film is formed on the substrate surface during the formation of the polyimide resin insulation layer, during which the substrate is heated to a temperature of 200° to 300° C. The cuprous oxide film on the substrate has a greater effect than cuprous oxide inside the substrate does.

To cope with this problem, it is considered to take a measure to prevent the oxide film from being formed on the substrate surface in the use of copper for the substrate, or alternatively use a substrate of a material, which is per se free from the formation of an oxide or does not permit reduction of an oxide in the presence of hydrogen.

The invention is now described in conjunction with a memory unit, wherein copper is used for the metal substrate.

To manufacture a memory unit, for instance shown in FIGS. 2A and 2B, a copper substrate 11 having dimensions of 10 × 10 × 2 mm. and a relatively smooth principal surface is preliminarily washed to remove greasy matter and the oxide film off the substrate surfaces. Then, a solution obtained by adding a polyimide resin, for instance, Pyre-M.L. (a trademark) manufactured by Du Pont de Nemours, E. I. in an amount of 30 grams to 18 cc. of a solvent of N-methyl-2-pyrrolidinone, is applied on the principal surface of the substrate by the spinner such that the insulation layer thickness is 10 microns, and is heated by horizontally placing the substrate in a nonoxidizing atmosphere of vacuum of an inert gas such as argon at a temperature of 200° to 300° C. for 30 minutes to 1 hour to cure the coating, thus obtaining a first insulation layer 12, which is excellent as the foundation for the magnetic thin film, on the substrate surface.

The substrate is then heated in a vacuum chamber at a temperature of 300° C. to deposit a first magnetic thin film **14*a* of permalloy to a thickness of 1,000 angstroms over the entire surface of the first insulation layer 12. Then, on the first magnetic thin film 14*a* are successively deposited at room temperature a copper layer 13 to a thickness of 8 microns and a molybdenum layer 22 to a thickness of 1,000 angstroms. Thereafter, the substrate 11 is heated again at a temperature of 300° C. to deposit a second magnetic thin film 14*b* of permalloy to a thickness of 1,000 angstroms on the molybdenum layer 22. Then the substrate wafer is subjected to a photo-resist treatment, and the second magnetic thin film 14*b* is chemically etched into parallel strips at a predetermined pitch by using a solution of ferric chloride as the etch solution. Then, the exposed portion of the molybdenum layer 22** is chemically etched by using a solution of caustic soda and a salt of red prussiate.

Then, the portion of the copper layer 13 exposed by the previous etching step and the first magnetic thin film **14*a* of permalloy are etched by using a solution of ferric chloride, followed by plating permalloy on the exposed side surfaces of the resultant strips of copper layer 13 to form third magnetic thin films 14*c*. As a result, there is formed a closed magnetic circuit about each of the digit lines 13** of copper. The closed magnetic circuit is not essential, but a quasi-closed magnetic circuit may suffice, which is obtained by omitting the step of plating permalloy on the side surfaces of the strip.

Thereafter, the same solution of polyimide resin as mentioned above is applied on the first digit line group 13 and the exposed portion of the first insulation layer 12 by the spinner, and is cured by heating it in a nonoxidizing atmosphere to form a second insulation layer 15. In this process, it is so arranged as to have a thickness of 10 microns of the portion of the resultant insulation layer atop the first digit line group 13.

Over the entire surface of the second insulation layer 15 is then deposited a copper layer to a thickness of 4 microns. It is to be appreciated that the second insulation layer 15 is made to have a very smooth upper surface, notwithstanding the unevenness of the lower foundation due to the presence of the first group digit lines 13. The deposited copper layer is etched into parallel strips at a predetermined pitch and at right angles to the digit lines of the first digit line group 13 by using a solution of ferric chloride as the etch solution to form the group of word lines 16. Subsequently, the aforementioned polyimide resin solution is applied on the word line group 16 and the exposed portion of the second insulation layer 15 by the spinner, and is then thermally cured to form a third insulation layer 17 having a thickness of 10 microns.

Then, over the entire surface of the third insulation layer 17 are successively deposited permalloy at a temperature of 300° C., then copper 18 and molybdenum 23 at room temperature and again permalloy at a temperature of 300° C. to the respective thicknesses similar to those of the first digit line 13, which are subsequently etched by the same means as above except for portions precisely over the first digit lines 13, followed by plating permalloy on the exposed side surfaces of the resultant strips to form respective closed magnetic circuits of permalloy 19 so as to obtain a second group digit lines 18.

Thereafter, there is formed on the second digit line group 18 and the exposed portion of the third insulation layer 17 a fourth insulation layer 20, on which is then formed a copper layer 21 to a thickness of about 10 microns, by vacuum deposition and electroplating. Since the insulation layer 20 is formed after the permalloy deposition, it is not necessary to use the polyimide resin for it, but other organic insulating materials may be used instead. In the foregoing manufacturing process, the permalloy deposition processes were carried out in a magnetic field of an intensity of about 100 oersteds established in the direction perpendicular to the digit lines to be formed thereafter.

The memory unit obtained in this manner is free from the generation of bubbles and has excellent performance. The memory shown in FIGS. 1A and 1B may also be manufactured in a similar way.

With the memory of the preceding construction having a width of the first and second digit lines of 100 microns, a distance between adjacent digit lines of 100 microns, a width of the word lines of 150 microns and a distance of adjacent word lines of 150 microns, it is possible to attain simultaneous nondestructive memorizing action of the first and second digit lines with digit current of 20 milliamperes, and an output of 80 mv.ns was obtained with word current of 150 milliamperes. The bit density attained is about 15 bits per square millimeter, which is about 15 times that of the wire memory.

In the preceding embodiments, the generation of bubbles is prevented by thermally curing the polyimide resin in a nonoxidizing atmosphere. It is also possible to prevent the generation of bubbles without having resort to the nonoxidizing atmosphere by improving the metal substrate.

The substrate is required to be stable in air, a good conductor of electricity, non-ferromagnetic, and free from the above generation of bubbles.

Regarding the last requirement of the substrate, namely, freedom from the generation of bubbles, the suitable substrate materials, which are required to be metallic, may be selected from the standpoint of the free energy of formation of metal oxides. As the temperature for curing the polyimide resin and the temperature for the permalloy deposition are 200° to 300° C., the free energy of formation of metal oxides only in this temperature range is taken into consideration.

At a temperature of, for instance, 300° C., the free energy of formation of water vapor from hydrogen is −105 kilocalories per mol of oxygen. Accordingly, the substrate requirement is considered in the following three cases:

A. When the free energy of formation of metal oxide at the temperature of 300° C. is positive or zero;

B. When the energy is 0 to −105 kilocalories per mol of oxygen; and

C. When the energy is lower than −105 kilocalories per mol of oxygen.

In case A, no metal oxide is formed, so that water vapor is not produced even if hydrogen penetrates into the substrate body. When this condition together with the above general requirement is taken into consideration, gold, silver and their alloy are suitable as the substrate material. As gold and silver are both expensive, a copper substrate plated with gold, silver or an alloy of gold and silver is used in practice.

In case C, the metal oxide is not reduced in the presence of hydrogen, so that bubbles are not generated. The metal oxide is generally a poor conductor of electricity, and is unsuitable as the substrate material. Such metals as aluminum, however, are used for the substrate, for with a substrate of such material merely a superficial subtle oxide film is formed and the oxidization does not take place within the body of the substrate.

With the metals falling within case B, the substrate is deemed to contain an oxide, which is reduced with hydrogen, giving rise to bubbles. For copper, which is most frequently used as the substrate, the free energy of oxide formation at the temperature of 300° C. is −60 kilocalories per mol of oxygen, so that copper falls within case B. Such metal, therefore, can not be used per se as the substrate material.

However, by adding a slight amount of an element, for which the free energy of oxide formation is less than −105 kilocalories per mol of oxygen, the oxide of copper is replaced by the oxide of the added element, rendering the state of oxygen involved stable. Such an oxide is not reduced by hydrogen.

The suitable elements to be added are beryllium, tin, zinc, manganese, etc. For example, for beryllium the free energy of the oxide formation is −130 to −120 kilocalories, and it forms a stable oxide refusing reduction by hydrogen. The purity of the electrolytically refined copper is 99.95 per cent, and 0.03 to 0.05 per cent of oxygen is present in the form of cuprous oxide. As the oxygen content is thought to increase due to the after-oxidization, the element to be added into copper is preferably in a proportion of 3 to 5 per cent.

Experiments have revealed that the memories manufactured by using the aforementioned substrates coated with gold or silver, the aluminum substrate and the copper substrates containing beryllium and by the foregoing manufacturing method without a nonoxidizing atmosphere are entirely free from the bubble generation and excellent in performance.

It is to be understood that the dimensions of the construction of the foregoing embodiments of the memory are merely exemplary and by no means limitative. Also, the drawing is simplified, and the relative dimensions of the parts of the construction have no bearing upon those of the actual unit.

What we claim is:

1. A flat type magnetic thin film memory comprising a metal substrate, at least one drive line group provided with a permalloy thin film and extending over and parallel with said substrate, and an insulation layer of a polyimide resin interposed between said substrate and said drive line group.

2. A flat type magnetic thin film memory comprising a metal substrate composed of copper, at least one drive line group provided with a permalloy thin film and extending over and parallel with said substrate, and an insulation layer of a polyimide resin which is formed by thermal curing in a nonoxidizing atmosphere interposed between said substrate and said drive line group.

3. A flat type magnetic thin film memory comprising a metal substrate of a material selected from a group consisting of gold, silver and their alloys, at least one drive line group provided with a permalloy thin film and extending over and parallel with said substrate, and an insulation layer of a polyimide resin interposed between said substrate and said drive line group.

4. A flat type magnetic thin film memory comprising a metal substrate provided with a coating of a material selected from a group consisting of gold, silver and their alloys, at least one drive line group provided with a permalloy thin film and extending over and parallel with said substrate, and an insulation layer of a polyimide resin interposed between said substrate and said drive line group.

5. The flat type magnetic thin film memory as claimed in claim 4 wherein said metal substrate is of copper provided with said coating.

6. A flat type magnetic thin film memory comprising a substrate of a metal, for which the free energy of the oxide formation is less than −105 kilocalories per mol of oxygen, at least one drive line group provided with a permalloy thin film and extending over and parallel with said substrate, and an insulation layer of a polyimide resin interposed between said substrate and said drive line group.

7. The flat type magnetic thin film memory as claimed in claim 6 wherein said substrate is of aluminum.

8. A flat type magnetic thin film memory comprising a metal substrate composed of copper and containing a metallic element, for which the free energy of the oxide formation is less than −105 kilocalories, at least one drive line group provided with a permalloy thin film and extending over and parallel with said substrate, and an insulation layer of a polyimide resin interposed between said substrate and said drive line group.

9. The flat type magnetic thin film memory as claimed in claim 8 wherein said element contained in said substrate is selected from a group consisting of beryllium, tin, zinc and manganese.

* * * * *